United States Patent
Schubert et al.

[11] Patent Number: 6,105,679
[45] Date of Patent: Aug. 22, 2000

[54] CONTROL SYSTEM FOR A HITCHED OR TRAILED IMPLEMENT

[75] Inventors: William L. Schubert, Downers Grove; Abraham Orbach, Naperville, both of Ill.

[73] Assignee: Case Corporation, Racine, Wis.

[21] Appl. No.: 09/182,376

[22] Filed: Oct. 29, 1998

[51] Int. Cl.[7] .................................................. A01B 63/112
[52] U.S. Cl. ...................................... 172/4; 172/7; 701/50
[58] Field of Search ........................... 172/4, 7, 12, 316, 172/328; 701/50

[56] References Cited

U.S. PATENT DOCUMENTS

| | | | |
|---|---|---|---|
| 3,513,916 | 5/1970 | Hyler | 172/4 |
| 3,653,446 | 4/1972 | Kalmon | 172/4 |
| 4,120,364 | 10/1978 | Wooldridge | 172/4 X |
| 4,231,432 | 11/1980 | Jennings | 172/7 |
| 5,152,347 | 10/1992 | Miller | 172/7 |
| 5,421,416 | 6/1995 | Orbach et al. | 172/4 |
| 5,579,850 | 12/1996 | Kimura et al. | 172/4 |
| 5,620,053 | 4/1997 | Kamikawa et al. | 172/4 |

OTHER PUBLICATIONS

Power Weight–Transfer Hitch automatically increases traction to keep you moving (3 pgs.) Aug. 1975.

Primary Examiner—Christopher J. Novosad
Attorney, Agent, or Firm—Foley & Lardner

[57] ABSTRACT

A control system for a hitched or trailed implement coupled to a work vehicle is disclosed herein. The control system allows control to be selectively transferred between various types of implements by use of a hydraulic selector valve. An electronic control unit controls the actions of a hitch assembly actuator, a trailed implement, an auxiliary device, or some combination thereof as determined by the configuration of the hydraulic selector valve.

22 Claims, 5 Drawing Sheets

CONTROL SYSTEM FOR A HITCHED OR TRAILED IMPLEMENT

FIELD OF THE INVENTION

The present invention relates generally to control systems for work implements. More particularly, the present invention relates to a control system for selectively controlling the operations of different types of implements which may be hitched to or trailed by a work vehicle such as an agricultural tractor.

BACKGROUND OF THE INVENTION

Different types of control systems for hitch assemblies on work vehicles such as agricultural tractors are known. The purpose of many hitch control systems is to control the elevation of the hitch assembly to maintain a substantially constant depth of ground penetration for the ground-penetrating implement (e.g., a plow) hitched to the hitch assembly, or to maintain a substantially constant draft force exerted on the hitch assembly by the hitched implement's interaction with the ground, or to maintain a desired combination of position and draft force control. The control systems provide control signals to hydraulic valves which control the flow of pressurized hydraulic fluid to a hydraulic actuator coupled to the hitch assembly, wherein the hydraulic actuator responds by raising and lowering the hitch assembly, thereby raising and lowering the implement hitched thereto.

Known hitch control systems include simple control devices for generating a position command or a draft force command for the hitch assembly and, thus, for the ground-penetrating implement. The controls typically include a position command device for setting a desired position command, and a draft force command device for setting a desired draft force command. Some systems further include a "mix" control for mixing the position and draft force commands. Known systems also include position and load sensors for providing position and draft force feedback signals. To maintain the desired position or draft force, changing soil conditions in the field being worked create a need for raising and lowering the hitch assembly in closed-loop fashion in response to the respective feedback signal.

An exemplary hitch control system of the above-described type is disclosed in U.S. Pat. No. 5,421,416, entitled "Hitch Assembly Control System", commonly assigned to Case Corp., which includes an electronic control unit for generating control signals applied to hydraulic valves configured to control the flow of hydraulic fluid to a hydraulic cylinder which raises and lowers a hitch assembly.

Work vehicles such as agricultural tractors may also be called upon to pull other types of implements throughout the field being worked, in some cases before or after the same vehicle has been used with a hitched implement. For example, implements known as "trailed implements" are typically pulled behind the work vehicle via a draw bar. Some trailed implements include their own hydraulic lift systems including one or more cylinders for raising and lowering components of the trailed implement. When pulling a trailed implement having its own hydraulic lift system, it is desirable to control the actions of the trailed implement lift cylinder as opposed to controlling the actions of the hitch assembly lift cylinder. This may be accomplished by providing a separate control unit and separate hydraulic valve on the vehicle which are dedicated to controlling the trailed implement lift cylinder. However, the need for separate control units for controlling the hitch assembly lift cylinder and the trailed implement lift cylinder, and for separate hydraulic valves, increases complexity and cost compared to a control system having a single control unit and a single hydraulic valve. Requiring separate devices for commanding the hitched and trailed implements also increases complexity and cost. Thus, it would be desirable to provide a control system for a work vehicle which includes a single control unit and single hydraulic valve for controlling different types of implements capable of being hitched to or trailed by the work vehicle, wherein control can be selectively transferred between a hitched implement or a trailed implement with a minimum of complexity and effort. It would also be desirable to provide the same type of control over a trailed implement as over a hitched implement, and to allow the same command devices to be used for commanding either type of implement.

In other situations, work vehicles may be called upon to move yet another type of implement. Implements of this type are also coupled to the hitch assembly, and can be raised and lowered in response to hitch control signals as described above. However, these implements also include hydraulically-powered gage or assist wheels to help support some of the implement's weight, thereby improving vehicle stability in the field and at headlands. The gage or assist wheels are powered by an implement hydraulic lift system which must also be controlled. It would also be desirable to provide a control system capable of simultaneously controlling the hitch assembly and such an independent implement lift system. It would further be desirable to provide such a control system which uses the existing auxiliary control system of the work vehicle to help provide these control functions.

There are also situations where an implement (e.g., a pesticide or herbicide tank) is attached to the work vehicle's hitch assembly, and it is desired to maintain the hitch assembly at a fixed position (e.g., at the uppermost position of the hitch assembly). In these situations, it would be desirable to provide a control system which controls the flow of hydraulic fluid directed to the implement while simultaneously insuring that the hitch assembly remains in the fixed position. It would also be desirable to provide such a control system wherein a low flow of fluid is provided to the actuator maintaining the fixed position of the hitch assembly for additional stability and to account for low-level leakage which would otherwise cause the hitch assembly to move from the fixed position (e.g., to be lowered).

Since a single work vehicle such as an agricultural tractor may be called upon to move any or all of these types of implements within a short period of time, there is a need for an adaptable control system for selectively controlling the operations of various types of implements which may be hitched to or trailed by a work vehicle such as an agricultural tractor. There is also a need for a control system for an implement hitched to or trailed by a work vehicle which selectively provides one of several different control functions by simply switching from one control function to another. A control system of this type provides the vehicle operator with additional flexibility in using the work vehicle, and provides the work vehicle manufacturer with diminished complexity and expense of manufacturing.

SUMMARY OF THE INVENTION

In one embodiment, the present invention provides a system for selectively controlling the elevation of a hitch assembly and the action of a trailed implement coupled to a work vehicle. The system includes a control unit which generates control signals, a hydraulic control valve which controls a flow of pressurized hydraulic fluid in response to the control signals, a hitch assembly hydraulic actuator which provides force to move the hitch assembly, and a trailed implement coupler for hydraulically coupling the trailed implement. The system also includes a selector valve which communicates the flow of pressurized hydraulic fluid between the hydraulic control valve and one of the hitch assembly actuator and the trailed implement coupler. The selector valve provides for control to be selectively transferred between the hitch assembly and the trailed implement.

In another embodiment, the invention provides a work vehicle having a frame, an operator station, and a propulsion system. The work vehicle includes a control unit, a selector valve, a hitch assembly coupled to the frame, a hitch assembly control valve coupled to the control unit and the selector valve, and a hitch assembly actuator coupled to the frame and the hitch assembly. The hitch assembly actuator moves the hitch assembly relative to the frame as controlled by the hitch assembly control valve. The vehicle also includes a trailed implement coupler coupled to the selector valve and capable of being coupled to a trailed implement actuator, an auxiliary coupler for attaching an auxiliary device, and an auxiliary control valve coupled to the control unit, the auxiliary coupler, and the selector valve. The selector valve provides for control to be selectively transferred between the hitch assembly, the trailed implement, and the auxiliary device.

In another embodiment, the invention provides a work vehicle having a frame, an operator station, and a propulsion system. The work vehicle includes a control unit which generates control signals, a selector valve having first and second operating positions, a first hydraulic control valve which receives the control signals from the control unit, a first actuator system hydraulically coupled to the selector valve, and a second actuator system hydraulically coupled to the selector valve. The selector valve directs a flow of hydraulic fluid from the first hydraulic control valve to the first actuator system when the selector valve is in the first operating position, and directs the flow of hydraulic fluid to the second actuator system when the selector valve is in the second operating position.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PRESENT INVENTION

Figure 1:
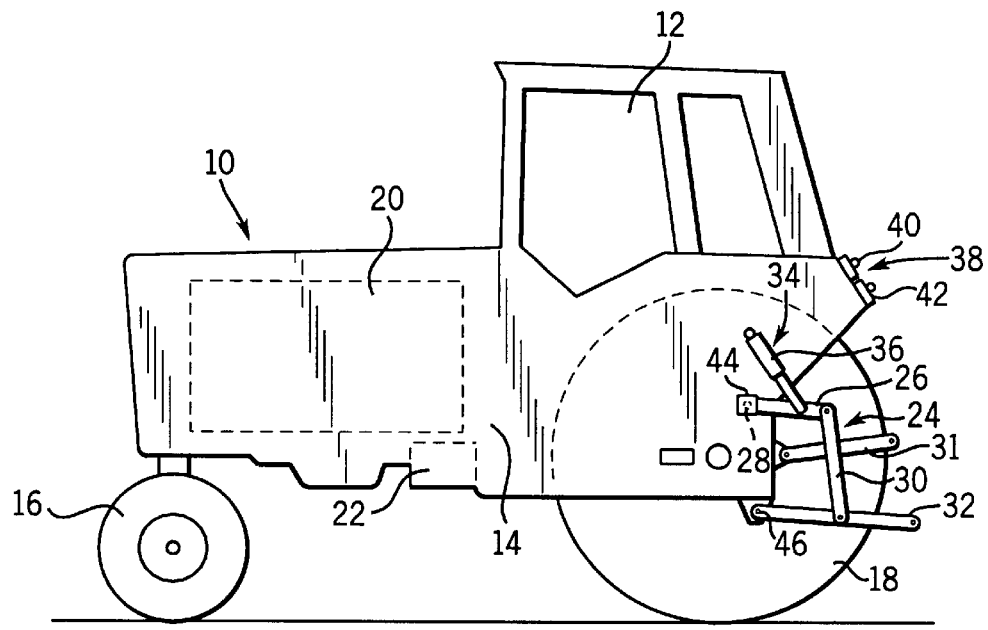
FIG. 1 is a simplified schematic illustration of an off-highway work vehicle, such as an agricultural tractor, equipped with a three-point hitch assembly.

FIG. 1 depicts an off-highway work vehicle such as an agricultural tractor 10. Tractor 10 includes an operator station 12 (i.e., cab) arranged on a frame 14 which is supported for movement across a field by a front pair of steerable wheels 16 and a rear pair of wheels 18. Wheels 18 are driven through a drive train including an engine 20 and a transmission (not shown) mounted on frame 14. Tractor 10 further includes an electrical system including a battery 22. It is to be appreciated, however, that the present invention is equally applicable to other forms of off-highway vehicles adapted to have hitch assemblies connected thereto such as, for example, bulldozers, articulated four-wheel drive tractors, front-wheel drive tractors, or other vehicles supported by tracks rather than wheels. For purposes of this description, the present invention will be described as being associated with an agricultural tractor.

Tractor 10 is provided with a hitch assembly 24 which connects a ground-penetrating assembly or other type of implement to a rear end of the tractor. The ground-penetrating assembly may be in the form of a conventional mold board plow or chisel plow. Alternative forms of ground-penetrating assemblies adapted to be towed behind tractor 10 may also be connected to assembly 24. Hitch assembly 24 is preferably a three-point hitch, including a pair of lift arms 26 which are each connected to and extend from a rock shaft 28. A pair of lift links 30 connect the other end of lift arms 26 to the middle portion of a pair of draft links 32. Hitch assembly 24 also includes an upper hitch link 31 having one end rotatably coupled to frame 14 of tractor 10. The position of draft links 32 and, thus, the elevation and working depth of the attached implement is controlled by a hitch actuator 34. Hitch actuator 34 preferably includes at least one hydraulic cylinder 36 connected to lift arms 26. Hitch actuator 34 is responsive to input signals for controlling the elevation of draft links 32 of hitch assembly 24. Hitch assembly 24 is one example of a hitch mechanism to which the present invention applies. It will be appreciated that the present invention is applicable to other types of hitch mechanisms.

One embodiment of hitch assembly 24 includes a remote switch assembly 38 which preferably includes a pair of remote momentary switches 40 and 42 mounted away from operator station 12 of tractor 10 and near the rear end thereof. In one embodiment, remote switch 40 includes a momentary up switch while remote switch 42 includes a momentary down switch. Alternatively, a two-position remote switch assembly could be used rather than separate switches 40 and 42.

The position of hitch assembly 24 is sensed by a sensor such as a rotary potentiometer 44 coupled to measure the angular position of rock shaft 28. The rotary position of rock shaft 28 is related to the elevational position of hitch assembly 24 and, thus, of the implement attached thereto, by the system geometry. After an implement attached to hitch assembly 24 has penetrated the ground, a draft force is established from the implement/ground interaction. Hitch assembly 24 is also provided with a draft or load sensor 46 for sensing the draft force exerted on hitch assembly 24 by the interaction of the implement and the ground. In one embodiment, draft sensor 46 includes a pair of load sensing pins arranged in left and right draft links 32 of hitch assembly 24. Alternatively, other sensor arrangements may be used for measuring draft force applied to hitch assembly 24. For example, strain gauges, linear voltage displacement transducers (LVDTs), and the like may be used.

Figure 2:
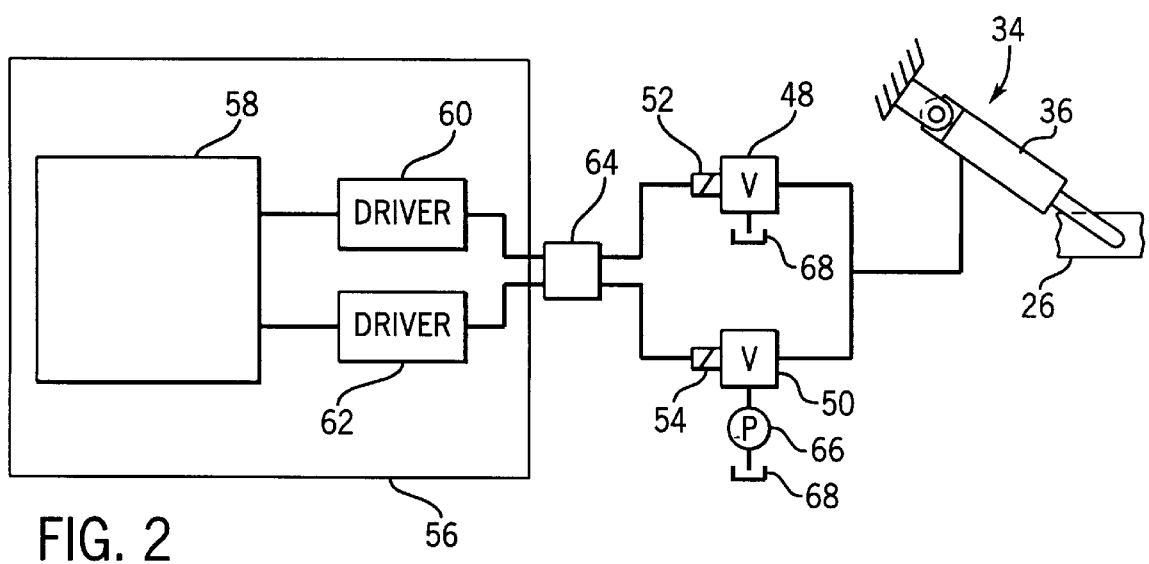
FIG. 2 is an electrical and hydraulic schematic block diagram of the hitch control system used to control the position of the hitch assembly of FIG. 1.

As depicted in FIG. 2, hydraulic cylinder 36 may be a single-acting cylinder that extends and retracts in response to the operation of hydraulic valves 48 and 50 that control the flow of pressurized hydraulic fluid to and from cylinder 36. As will be appreciated, the function of valves 48 and 50 can be embodied into a single valve (see, e.g., FIGS. 6–8) without departing from the spirit and scope of the present invention. Valves 48 and 50 are preferably solenoid-operated valves, each including an electric coil 52 and 54, respectively, which operates the respective valve and responds to electrical control signals generated by a controller 56. However, other forms of electrically-driven mechanisms can also be used to position draft links 32.

Controller 56 includes a control unit 58 that receives a series of inputs representing different operating characteristics and a pair of valve drivers 60 and 62. Valve drivers 60 and 62 are connected to, and control, the operation of valves 48 and 50 through a relay circuit 64. Preferably, each valve driver 60 and 62 is a pulse-width-modulated valve current driver but other forms of drivers can likewise be used to successfully operate valves 48 and 50 as commanded by controller 56.

In operation, control unit 58 communicates control signals to drivers 60 and 62, which drive relay circuit 64 to control solenoids 52 and 54. Extension of cylinder 36 occurs when electrical signals from relay circuit 64 cause valve 50 to open and valve 48 to close. During extension, open valve 50 communicates pressurized hydraulic fluid, drawn by a hydraulic pump 66 from a fluid reservoir 68, to cylinder 36. Retraction of cylinder 36 occurs when electrical signals from relay 64 cause valve 50 to close and valve 48 to open. During retraction, open valve 48 allows pressurized hydraulic fluid to be released from cylinder 36 back into hydraulic fluid reservoir 68.

Figure 3:
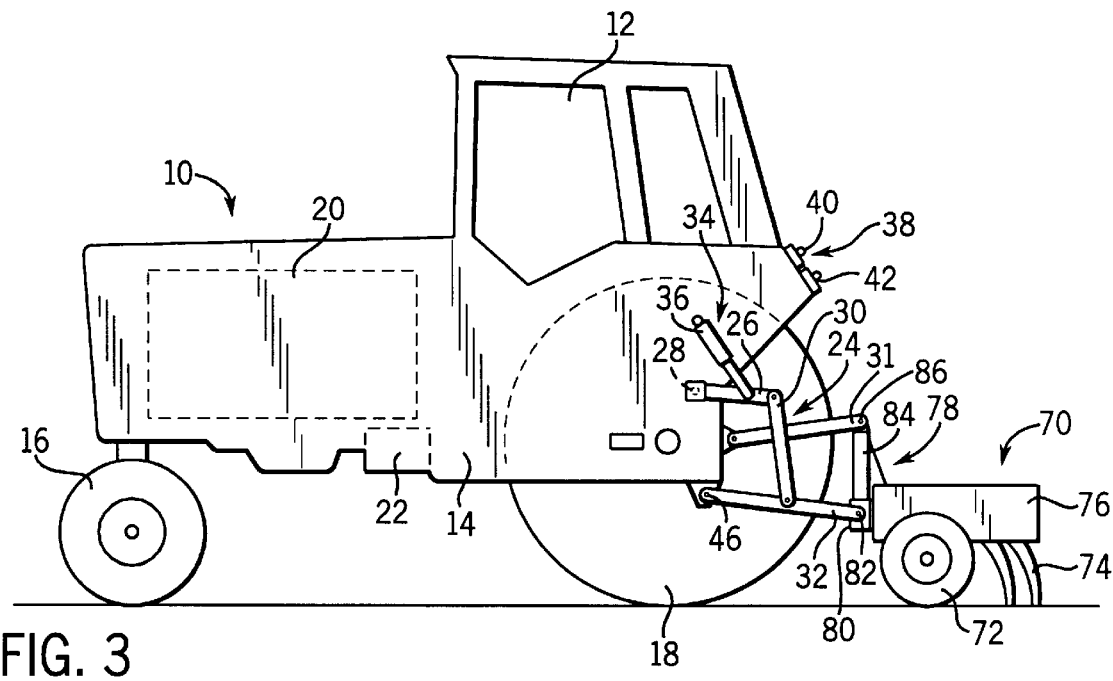
FIG. 3 is a simplified schematic illustration of the off highway vehicle of FIG. 1, wherein an implement has been attached to the mast hitch assembly.
Figure 5:
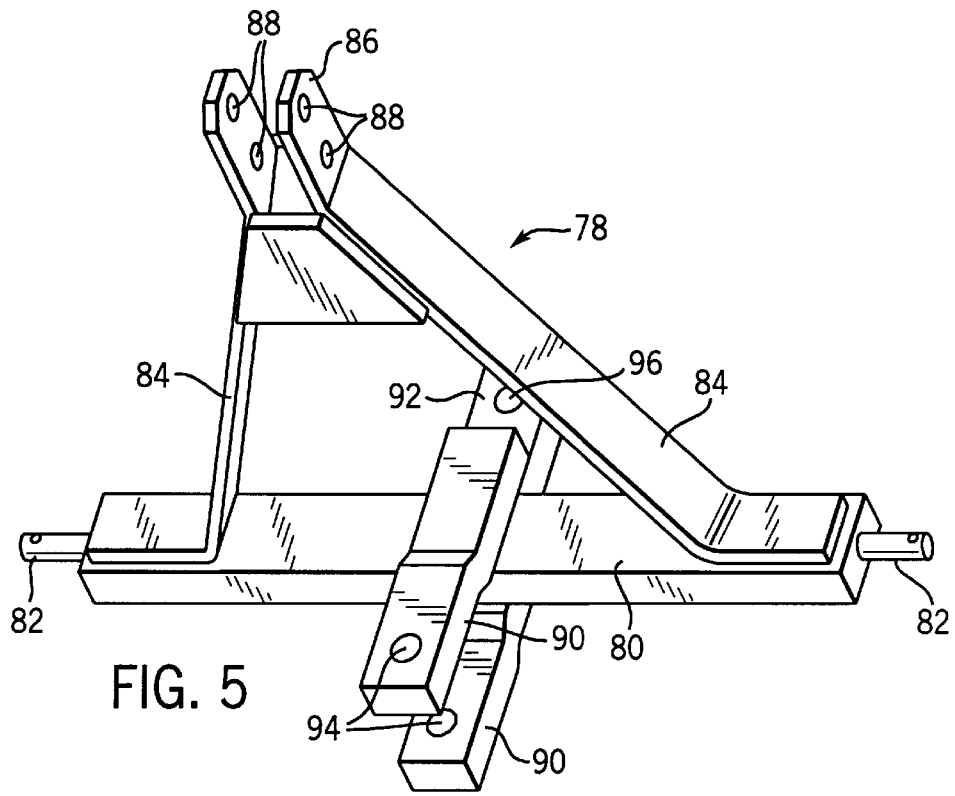
FIG. 5 is a perspective view of a draw bar mast assembly which can be used to attach a trailed implement to the hitch assembly of FIG. 1.

FIG. 3 depicts tractor 10 with a hitch mounted implement 70 attached. Hitch mounted implement 70 has gage wheels 72 and a set of ground-penetrating devices 74 (e.g., chisels) carried on a frame 76. Hitch mounted implement 70 is connected to a draw bar hitch assembly 78, shown further in FIG. 5, configured to connect implement 70 to hitch assembly 24. Draw bar hitch assembly 78 has a draw bar 80, connecting pins 82, support straps 84, a hitch tang 86 with hitch connection apertures 88 therethrough, implement connecting tangs 90, and alternate implement connecting tang 92. Hitch tang 86 of draw bar hitch assembly 78 is connected to upper hitch link 31 by a pin extending through hitch link 31 and hitch connection apertures 88. Support straps 84 connect hitch tang 86 with draw bar 80. Draw bar hitch assembly 78 is further connected to tractor 10 by hitch pins 82 extending from the ends of draw bar 80 which extend through apertures at the ends of draft links 32. As depicted in FIG. 5, implement connecting tangs 90 are connected to draw bar 80 along with alternate implement connecting tang 92. Trailed implement 70 is connected to tractor 10 by connecting either implement tangs 90 or alternate implement tang 92 to hitch mounted implement 70 using a pin (not shown) extending through an aperture in an implement hitch and apertures 94 of implement tangs 90 or through aperture 96 of alternative implement tang 92.

Figure 3A:
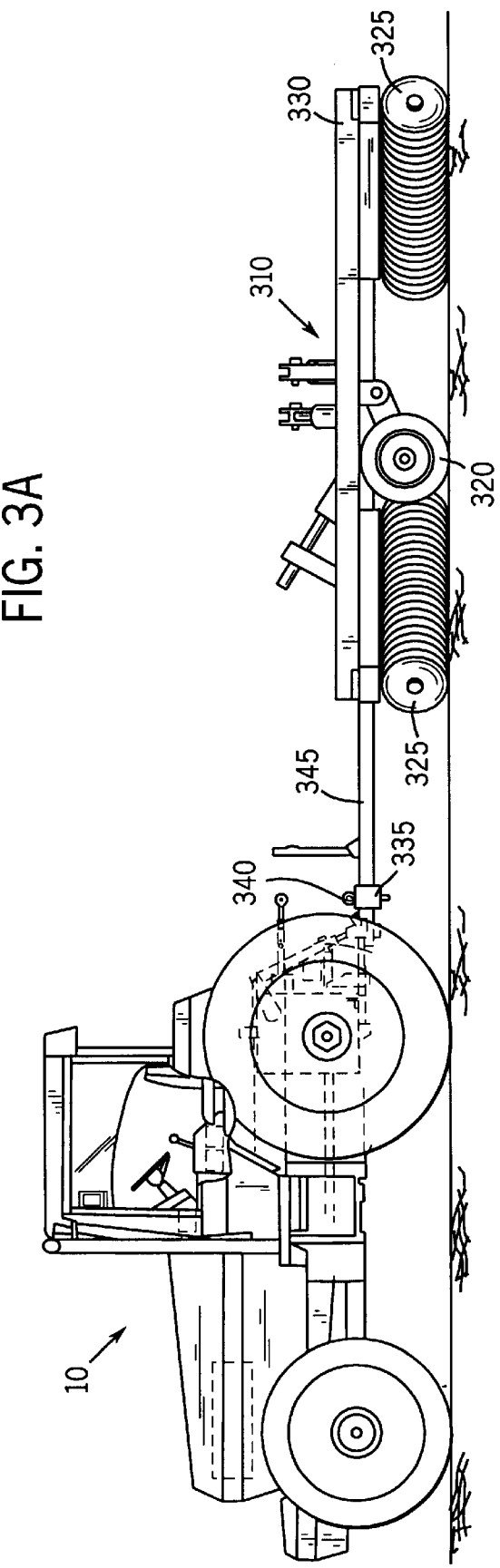
FIG. 3A is a simplified schematic illustration of the off highway vehicle of FIG. 1, wherein a trailed implement is attached to the hitch assembly.

Alternatively, FIG. 3A depicts tractor 10 with a trailed implement 310 attached. Trailed implement 310 has a set of wheels 320 and a set of ground-penetrating devices 325 (e.g., disk harrows, or field cultivators) carried on a frame 330. Trailed implement 310 is connected to a hitch 335 having a pin connection 340. Pin connection 340 may be a draft load sensing pin adapted to communicate an electrical signal representative of the draft load created by trailed implement 310. Alternatively, other draft load sensing systems may be utilized at other locations on the tractor or at other locations on the implement draw bar, to sense draft load. For example, pin connection 340 being a draft load sensing pin may also be installed at the forward end of the tractor draw bar where the draw bar is attached to the tractor chassis. Further, a load transducer, such as, but not limited to strain gage load transducers or piezo-electric devices may be located on the tractor draw bar or on the implement draw bar to sense the implement draft load and provide output signals representative of the draft load created by trailed implement 310. Trailed implement 310 is connected to tractor 10 by a long tongue 345 coupling frame 330 to hitch 335. Alternatively, many other trailed implements configured to perform a variety of functions on an agricultural field are known.

Figure 4:
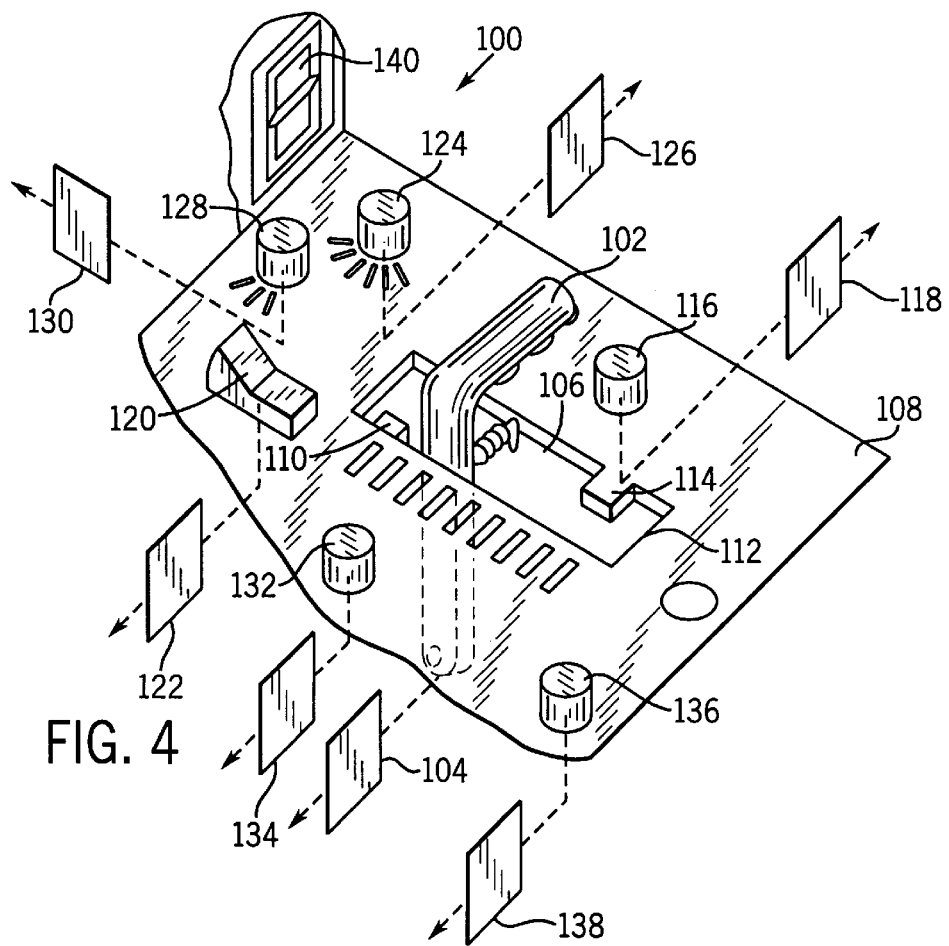
FIG. 4 is a schematic illustration of an exemplary control console arrangement in the operator cab of the tractor of FIG. 1.

Turning to FIG. 4, an operator control console 100 including a plurality of operator command devices is arranged in operator station 12 of tractor 10. Control console 100 may selectively be operated by the vehicle operator for commanding vertical movement of the implement hitched to or trailed by tractor 10. The command devices allow the operator to command movement of the implement between an upper position and a lower position, and for establishing a desired working position or draft force for the implement. The implement may be hitched to hitch assembly 24 such that the implement can be raised and lowered by cylinder 36, or may be attached to draw bar 80 and include a separate implement lift cylinder. In one embodiment, control console 100 is configured as described in U.S. Pat. No. 5,421,416, incorporated herein by reference. However, other control consoles and hitch control systems are known, such as described in U.S. Pat. Nos. 5,469,921, 5,472,056, 5,549,166 and 5,684,691, each of which is commonly assigned and incorporated herein by reference.

Control console 100 includes an adjustable position command device 102, such as a movable lever, coupled to a signal device such as a transducer or potentiometer 104. Command lever 102 is movable within an elongated slot 106 of a console plate 108. An adjustable limit stop 110 connected to and carried by plate 108 acts as mechanical stop for device 102 and sets a lower limit stop. The opposite end 112 of slot 106 likewise acts as mechanical stop for device 102 and sets an extreme upper limit stop. Protrusion 114 is provided in slot 106 and cooperates with device 102 to maintain device 102 adjacent to end 112, and serves to maintain the implement in its extreme raised position, such as for transport. Depending upon the position of adjustable device 102, potentiometer 104 generates a signal communicated to a control unit 200 (see FIGS. 6–8). The signal represents a desired position of the implement.

Figure 6:
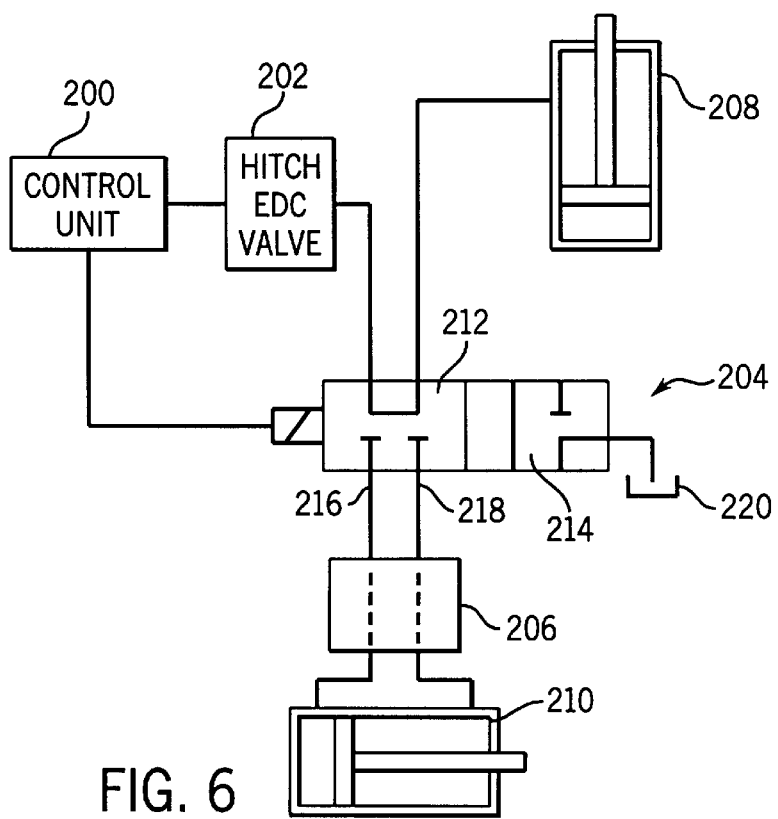
FIG. 6 is a schematic block diagram of one embodiment of a control system including a single control unit, a single hydraulic valve, and a two-position hydraulic selector valve for selectively controlling the flow of pressurized hydraulic fluid to either a hitch assembly lift cylinder or an implement lift cylinder.
Figure 7:
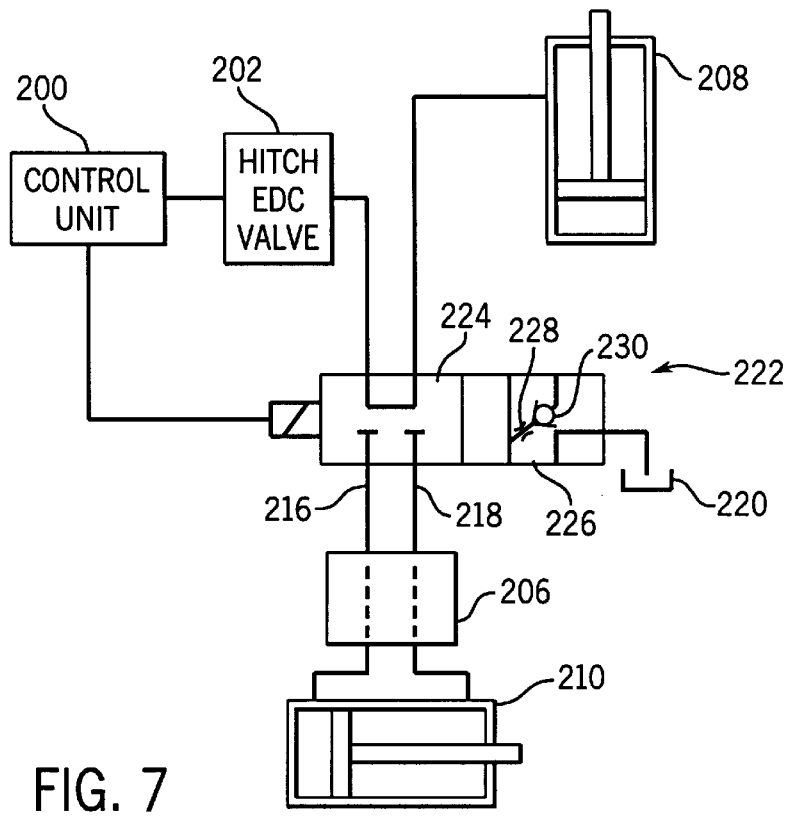
FIG. 7 is a schematic block diagram of another embodiment of a control system including a single control unit, a single hydraulic valve, and a two-position hydraulic selector valve for selectively controlling the flow of hydraulic fluid to either a hitch assembly lift cylinder or an implement lift cylinder.
Figure 8:
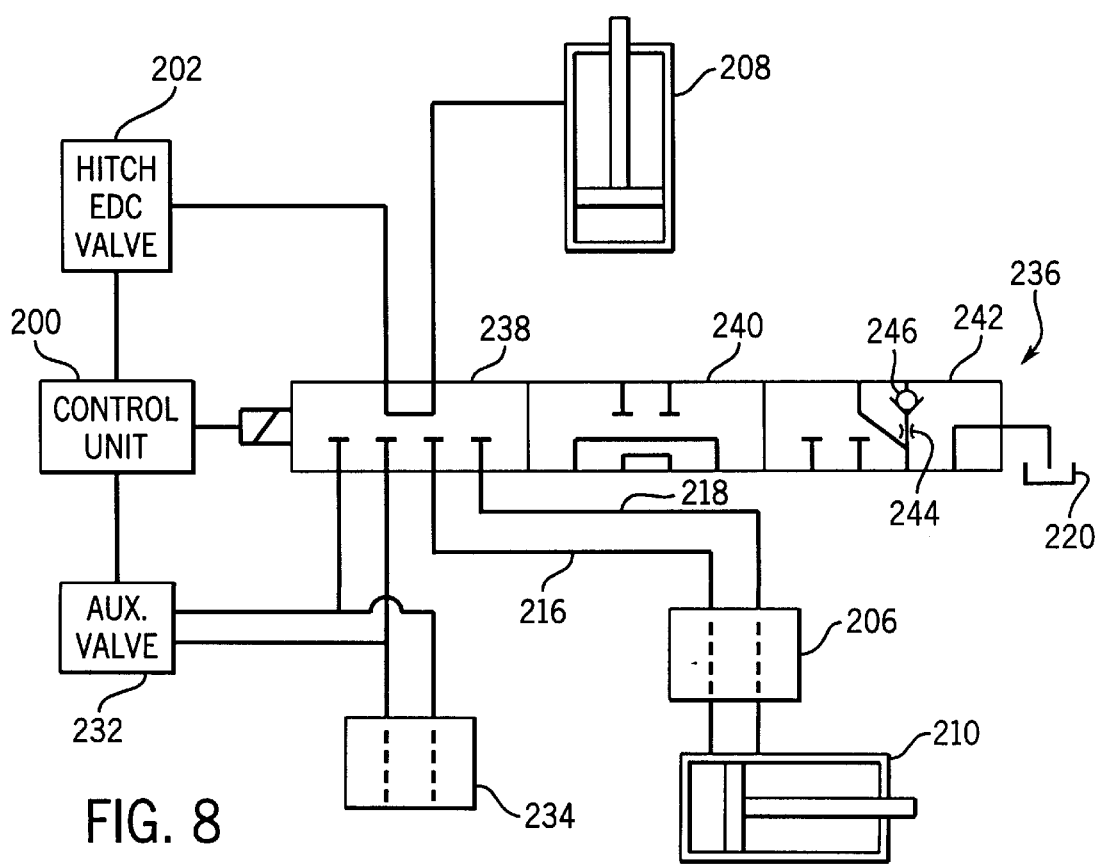
FIG. 8 is a schematic block diagram of another embodiment of a control system including a single control unit, two hydraulic valves, and a three-position hydraulic selector valve for selectively controlling the flow of hydraulic fluid to either a hitch assembly lift cylinder or an implement lift cylinder.

Control console 100 also includes an adjustable draft force command device 116, such as a control knob, coupled to a signal device such as a transducer or potentiometer 118. Draft force command device 116 is movable by the operator to multiple positions to set a desired level of draft force to be exerted by the implement on hitch assembly 24 during a plowing operation or other ground-engaging operations. Depending upon the position of command device 116, potentiometer 118 provides a signal to control unit 200 (FIGS. 6–8). The signal represents an operator controlled reference draft force related to the desired depth of the implement during operation.

Control console 100 may include an up/down switch assembly 120 for independently controlling the implement elevation between a lower limit position and an upper limit position independently of hitch position command device 102 and draft force command device 116. Switch assembly 120 is preferably configured as a rocker switch selectively movable between an up position and a down position. In one embodiment, switch assembly 120 can also be moved to a down M position accessible from the down position. The down M position is a momentary position maintained as long as the operator holds switch assembly 120 in the down M position. A suitable sensor 122, such as a potentiometer, monitors the three possible positions of switch assembly 120 and provides any of three output signals indicative of the position of switch assembly 120 to control unit 200 (FIGS. 6–8).

Control console 100 further includes an operator controlled descent device 124 for enabling the operator to control the rate at which the implement moves from a higher position to a lower position. Descent device 124 is adjustable by the operator and includes a potentiometer 126 or other suitable device to provide a signal representative of the operator selected descent rate to control unit 200 (FIGS. 6–8).

An upper limit knob assembly 128 allows the operator to set or limit the maximum vertical movement of the implement independently of position or draft force command devices 102 or 116, thereby avoiding inadvertent errors which could be incurred with movement of command devices 102 or 116. A potentiometer 130 or other suitable device provides an input signal indicative of the setting of upper limit knob assembly 128 to control unit 200 (FIGS. 6–8).

For accommodating changes in soil conditions throughout the field being worked, and a myriad of other considerations, control unit 200 also receives input signals from a travel knob 132. Travel knob 132 is an operator-adjustable knob mechanism which, during operation, allows an implement to move within a predetermined vertical range independent of the desired settings selected by position command device 102 and draft force command device 116. Travel knob 132 is movable through a range of settings, with each setting on travel knob 132 allowing for a predetermined range of vertical travel. A potentiometer 134 or other suitable device provides an input to control unit 200 indicative of the setting of travel knob 132. Control unit 200 may also receive input signals from a response knob 136. The purpose of response knob 136 is to control the response time over which the implement vertically moves to maintain a substantially constant predetermined draft force. Response knob 136 may be selectively set at a range of positions representative of different response times. A potentiometer 138 or other suitable device provides an input signal representative of the operator selected response rate set by response knob 136. The signal from potentiometer 138 is communicated to control unit 200.

An indicator assembly 140 may optionally be provided with control console 100. As depicted in FIG. 4, indicator assembly 87 may be an alpha-numeric display that provides instructional messages to a user or directs the user to the correction or repair of various detected errors. Alternatively, other types of display devices may be used including, but not limited to, LCD displays and CRT displays.

Referring to FIG. 6, a schematic block diagram of a first embodiment of the implement control system is illustrated. The control system includes a control unit 200, a hitch electronic draft control (EDC) valve 202, a two-position hydraulic selector valve 204, and a trailed implement coupler 206. The control system may be selectively coupled to either a hitch assembly lift cylinder 208 or a trailed implement lift cylinder 210 by the vehicle operator. Control unit 200 receives electrical signals from the above-described command devices, and from various sensors including, but not limited to, position sensor 44 and draft force sensor 46. Control unit 200 communicates control signals to hitch EDC valve 202. Hitch EDC valve 202 responds by controlling the flow of hydraulic fluid to selector valve 204, thereby controlling the flow to cylinder 208 or 210 as selected by the operator.

When selector valve 204 is in its first position 212, which can be referred to as a "hitched implement position", hitch EDC valve 202 is hydraulically connected to hitch assembly lift cylinder 208 such that control unit 200 controls the actions of lift cylinder 208, and hydraulic fluid flow to trailed implement coupler 206 is cut off. The first position of selector valve 204 is used when an implement such as a plow is connected to three-point hitch assembly 24. In this configuration, the control system operates in the same or similar manner as the hitch assembly control system disclosed in U.S. Pat. No. 5,421,416, incorporated herein by reference, or by other hitch assembly control systems such as the other U.S. patents incorporated by reference in this specification.

When selector valve 204 is in its second position 214, which can be referred to as a "trailed implement position", hitch EDC valve 202 is hydraulically connected to trailed implement lift cylinder 210 such that control unit 200 controls the actions of trailed implement lift cylinder 210. In the second position 214 of selector valve 204, hydraulic fluid flow to hitch assembly lift cylinder 208 is cut off. The second position of valve 204 is used, for example, when an implement is connected to tractor 10 via a draw bar, and is not raised and lowered by hitch assembly 24.

When present, trailed implement lift cylinder 210 is depicted in FIG. 6 as a double-acting hydraulic cylinder hydraulically connected to a first hydraulic line 216 and a second hydraulic line 218 via coupler 206. When valve 204 is in first position 212, lines 216 and 218 are cut off. However, when valve 204 is in second position 214, hitch EDC valve 202 is connected to first hydraulic line 216, second hydraulic line 218 is connected to a reservoir 220, and hitch assembly lift cylinder 208 is closed off to maintain hitch assembly 24 in a substantially fixed position.

Thus, the control system of FIG. 6 can selectively control either hitch assembly lift cylinder 208 or trailed implement lift cylinder 210 using single control unit 200 and single electronic control valve 202. The use of a single control unit and single control valve to control two different hydraulic cylinders provides flexibility to the operator with lower manufacturing costs as compared to control systems having two control units and two control valves, each control unit and control valve being dedicated to control the actions of a single lift cylinder or single set of lift cylinders.

Another embodiment of the control system is shown in FIG. 7. This embodiment is similar to that of FIG. 6 except that selector valve 204 is replaced by a two-position selector valve 222. Selector valve 222 has a first position 224 wherein control unit 200 controls the actions of hitch assembly lift cylinder 208, and a second position 226 wherein control unit 200 controls the actions of trailed implement lift cylinder 210. The difference is that, when in second position 226, selector valve 222 includes a restricted orifice 228 in series with a one-way valve 230 between hitch EDC valve 202 and hitch assembly lift cylinder 208. Restricted orifice 228 and one-way valve 230 cooperate to allow hydraulic fluid supplied by EDC valve 202 to bleed to hitch assembly lift cylinder 208 to maintain lift cylinder 208 in a substantially fixed position. This is true even where there is a small amount of fluid loss due to a leak in the hydraulic lines coupled to lift cylinder 208, or the hydraulic couplings. Whenever EDC valve 202 supplies fluid to trailed implement lift cylinder 210, a small amount of fluid is supplied to hitch assembly lift cylinder 208. Thus, second position 226 of valve 222 maintains hitch assembly lift cylinder 208, and thus hitch assembly 24, in a substantially fixed position so as to carry, e.g., a herbicide tank without interfering with the implement itself. Maintaining stability of lift cylinder 208 aids in keeping the herbicide tank relatively stable. Concurrently, implement lift cylinder 210 is free to move according to control signals applied by control unit 200 to hitch EDC valve 202.

Referring to FIG. 8, another embodiment of the implement control system is shown. This embodiment includes control unit 200, hitch EDC valve 202, an auxiliary valve 232 of the tractor's auxiliary hydraulic system, an auxiliary valve coupler 234, a three-position hydraulic selector valve 236, and trailed implement coupler 206. The control system may be selectively coupled to either hitch assembly lift cylinder 208 or trailed implement lift cylinder 210. Control unit 200 receives electrical signals from the above-described command devices, and from various sensors including, but not limited to, position sensor 44 and draft force sensor 46. Control unit 200 communicates control signals to hitch EDC valve 202 and auxiliary valve 232. Hitch EDC valve 202 responds to the control signals by controlling the flow of hydraulic fluid to selector valve 236, thereby controlling the flow to lift cylinder 208 or 210 as selected by valve 236. Auxiliary valve 232 responds by controlling the flow of fluid either to auxiliary valve coupler 234, when an auxiliary hydraulic device is connected thereto, or to cylinder 210, as selected by valve 236.

When selector valve 236 is in its first position 238, hitch EDC valve 202 is hydraulically connected to hitch assembly lift cylinder 208 such that control unit 200 controls the actions of lift cylinder 208. In addition, auxiliary valve 232 is cut off from both lift cylinders 208 and 210, and is hydraulically connected only to auxiliary valve coupler 234, and any auxiliary hydraulic device coupled thereto, such that control unit 200 also controls the actions of the auxiliary hydraulic device. Alternatively, auxiliary valve 232 can receive its control signals from a separate control unit other than control unit 200, such as a dedicated auxiliary valve control unit. Further, hydraulic fluid flow through trailed implement coupler 206 is cut off. The first position 238 of selector valve 236 is selected by the operator, for example, when an implement such as a plow is connected to three-point hitch assembly 24.

With selector valve 236 in first position 238 and an auxiliary lift cylinder for providing "simultaneous lift" for an implement attached to hitch assembly 24, control unit 200 can simultaneously communicate control signals to hitch assembly lift cylinder 208 and auxiliary valve 232 to control the actions of both lift cylinder 208 and the auxiliary lift cylinder. Therefore control unit 200 can provide "simultaneous lift" for an implement equipped with hydraulic powered gage or assist wheels. The hydraulic powered gage or assist wheels help support some of the implement weight and therefore improve tractor stability in the field being worked and at field end.

When selector valve 236 is in its second position 240, hitch EDC valve 202 is disconnected from hitch assembly lift cylinder 208 such that cylinder 208 will remain in a substantially fixed position. In the second position 240, auxiliary valve 232 is hydraulically connected to trailed implement lift cylinder 210 via trailed implement coupler 206 such that control unit 200 controls the actions of lift cylinder 210. It is also possible, when selector valve 236 is in second position 240, to attach an auxiliary hydraulic device to auxiliary valve coupler 234 and to connect trailed implement lift cylinder 210 to trailed implement coupler 206. Then, control unit 200 communicates control signals to auxiliary valve 232 which simultaneously controls the actions of both the auxiliary hydraulic device and trailed implement lift cylinder 210.

When selector valve 236 is in its third position 242, hitch EDC valve 202 is hydraulically connected to trailed implement lift cylinder 210 via trailed implement coupler 206. In addition, in third position 242, selector valve 236 includes a restricted orifice 244 in series with a one-way valve 246 between hitch EDC valve 202 and hitch assembly lift cylinder 208. Restricted orifice 244 and one-way valve 246 cooperate to allow hydraulic fluid supplied by EDC valve 202 to bleed through to hitch assembly lift cylinder 208 to maintain lift cylinder 208 in a substantially fixed and uppermost position. This will remain true even where there is a small amount of fluid loss due to a leak in the hydraulic lines leading to lift cylinder 208, or in the hydraulic couplings. Third position 242 of selector valve 236 may thus be used to maintain hitch assembly lift cylinder 208, and thus hitch assembly 24, in a substantially fixed position while providing concurrent control of trailed implement lift cylinder 210. Further, auxiliary valve 232 is cut off from lift cylinders 208 and 210 when selector valve 236 is in third position 242 and, when an auxiliary hydraulic device is connected to auxiliary valve coupler 234, auxiliary valve 232 is hydraulically connected to the auxiliary hydraulic device such that control unit 200 also controls the actions of the auxiliary hydraulic device. Again, another control unit 200 can be used to provide the control signals applied to auxiliary valve 232.

Thus, the hydraulic control systems of FIGS. 6–8 allow a single control unit 200 to provide selective control of hitch assembly lift cylinder 208, trailed implement lift cylinder 210, and an auxiliary hydraulic device attached to coupler 234. The controlled operations could be a fixed program sequence or a learned program sequence based on an operator selected program. The program could be time based or based on other parameters such as travel speed, draft load, implement position, slip and other parameters. Thus, the control systems of FIGS. 6–8 selectively provide some or all of the control functions described in U.S. Pat. No. 5,421,416, commonly assigned and incorporated herein by reference, to an implement hitched to or trailed by a work vehicle such as an agricultural tractor.

It is understood that, while the detailed drawings and specific examples given describe preferred exemplary embodiments of the present invention, they are for the purpose of illustration only. The apparatus and method of the invention is not limited to the precise details and conditions disclosed. For example, although a tractor with a three-point hitch is depicted in the figures, the present invention may be applied to other work vehicles, such as construction vehicles, having other hitch arrangements. Also, although single-acting and double-acting hydraulic lift cylinders are depicted in certain locations, either single-acting or double-acting hydraulic lift cylinders may be used in any of the locations where hydraulic lift cylinders are used. Further, the control systems described above may be used in connection with a front-mounted hitch assembly. Various changes may be made to the details disclosed herein without departing from the spirit of the invention, as defined by the following claims.

What is claimed is:

1. A system for selectively controlling the elevation of a hitch assembly and the action of a trailed implement coupled to a work vehicle, comprising:

a control unit configured to generate control signals, wherein the control signals include a selector signal;

a hydraulic control valve coupled to the control unit and configured to control a flow of pressurized hydraulic fluid in response to the control signals;

a hitch assembly hydraulic actuator coupled to the hitch assembly and configured to provide force to move the hitch assembly;

a trailed implement coupler for hydraulically coupling the trailed implement; and a selector valve having a first selection and a second selection configured to communicate the flow of pressurized hydraulic fluid between the hydraulic control valve and one of the hitch assembly hydraulic actuator and the trailed implement coupler, wherein the selector signal applied to the selector valve provides for control to be selectively transferred between the hitch assembly and the trailed implement, the selector valve including a restricted orifice and a one-way valve in series with the restricted orifice, the restricted orifice and the one-way valve being selectively coupled between the hydraulic control valve and the hitch assembly hydraulic actuator when the second selection is made on the selector valve;

wherein the hydraulic control valve selectively controls actions of the hitch assembly, in isolation of the trailed implement, when the first selection is made on the selector valve, and the hydraulic control valve selectively controls actions of the trailed implement, and simultaneously maintains the hitch assembly in a substantially fixed position, when the second selection is made on the selector valve, the restricted orifice and the one-way valve cooperating to maintain the hitch assembly in the substantially fixed position while the hydraulic control valve substantially controls the action of the trailed implement.

2. The system of claim 1, wherein the hitch assembly is maintained substantially at an uppermost position.

3. The system of claim 1 wherein the hydraulic control valve has exactly one controlled hydraulic outlet.

4. The system of claim 1 wherein the selector valve substantially shuts off hydraulic fluid communication between the hydraulic control valve and one of the hitch assembly and the trailed implement coupler.

5. The system of claims 1, wherein the control unit is configured to generate control signals to provide selective control between the hitch assembly and the trailed implement based on at least one of a fixed program sequence and a learned program sequence.

6. A work vehicle having a frame, an operator station and a propulsion system, the work vehicle comprising:

a control unit configured to generate control signals;

a selector valve;

a hitch assembly coupled to the frame of the work vehicle;

a hitch assembly control valve coupled to the control unit and the selector valve;

a hitch assembly actuator coupled to the frame and to the hitch assembly, the hitch assembly actuator being configured to move the hitch assembly relative to the frame as controlled by the hitch assembly control valve;

a trailed implement coupler coupled to the selector valve, the trailed implement coupler capable of being coupled to a trailed implement actuator;

an auxiliary coupler for attaching an auxiliary device; and an auxiliary control valve coupled to the control unit, the auxiliary coupler, and the selector valve;

wherein the selector valve is configured to selectively transfer control between the hitch assembly, the trailed implement, and the auxiliary device based on the control signals.

7. The work vehicle of claim 6, wherein when the selector valve is in a first position, the hitch assembly control valve controls the hitch assembly actuator.

8. The work vehicle of claim 7, wherein when the selector valve is in a second position, the auxiliary control valve controls the trailed implement actuator.

9. The work vehicle of claim 8, wherein when the selector valve is in a third position, the hitch assembly control valve controls the trailed implement actuator while maintaining the hitch assembly in a substantially fixed position.

10. The system of claim 9, wherein the selector valve also includes:

a restricted orifice; and a one-way valve in series with the restricted orifice, wherein the restricted orifice and the one-way valve are selectively coupled between the hitch assembly control valve and the hitch assembly actuator when the selector valve is in the third position, and the restricted orifice and the one-way valve cooperate to maintain the hitch assembly in the substantially fixed position while the hitch assembly control valve substantially controls the trailed implement actuator.

11. The work vehicle of claim 6, wherein the control unit provides control signals to the hitch assembly control valve and the auxiliary control valve when the selector valve is in a first position, and the hitch assembly control valve controls the hitch assembly actuator and the auxiliary control valve controls the auxiliary device.

12. The work vehicle of claim 11, wherein the control unit selectively communicates control signals to one of the hitch assembly control valve and the auxiliary control valve.

13. The work vehicle of claim 6, wherein the hitch assembly is a three-point hitch assembly.

14. A work vehicle having a frame, an operator station and a propulsion system, the work vehicle comprising:

a control unit configured to generate control signals, wherein the control signals include a selector signal;

a selector valve having first and second operating positions;

a first hydraulic control valve coupled to the control unit and configured to receive the control signals from the control unit;

a first actuator system hydraulically coupled to the selector valve; and a second actuator system hydraulically coupled to the selector valve;

wherein the selector signal applied to the selector valve directs a flow of hydraulic fluid from the first hydraulic control valve to the first actuator system when the selector valve is in the first operating position, and directs the flow of hydraulic fluid to the second actuator system when the selector valve is in the second operating position and the selector valve also directs a reduced fluid flow to the first actuator system when the selector valve is in the second operating position.

15. The work vehicle of claim 14, wherein the first hydraulic control valve is an electronic draft control valve.

16. The work vehicle of claim 14, wherein the first hydraulic control valve has exactly one controlled hydraulic fluid outlet.

17. The work vehicle of claim 14, wherein the control unit is configured to generate control signals to provide selective control between the first actuator system and the second actuator system based on at least one of a fixed program sequence and a learned program sequence.

18. A work vehicle having a frame, an operator station and a propulsion system, the work vehicle comprising:

a control unit configured to generate control signals, wherein the control signals include a selector signal;

a selector valve having first, second, and third operating positions;

a first hydraulic control valve coupled to the control unit and configured to receive the control signals from the control unit;

a second hydraulic control valve coupled to the control unit and configured to receive the control signals from the control unit;

a first actuator system hydraulically coupled to the selector valve;

a second actuator system hydraulically coupled to the selector valve; and a third actuator system hydraulically coupled to the second hydraulic control valve and to the selector valve, wherein the selector signal applied to the selector valve directs a flow of hydraulic fluid from the first hydraulic control valve to the first actuator system when the selector valve is in the first operating position, and directs the flow of hydraulic fluid to the second actuator system when the selector valve is in the second operating position and, when the selector valve is in the third operating position, the selector valve directs a flow of hydraulic fluid from the second hydraulic control valve to the second actuator system, and the flow of hydraulic fluid from the second hydraulic control valve is directed to the third actuator system at each operating position of the selector valve.

19. The work vehicle of claim 17, wherein the selector valve also directs the flow of hydraulic fluid from the second hydraulic control valve to the second actuator system when the selector valve is in the third operating position.

20. The work vehicle of claim 18, wherein the second hydraulic control valve has exactly two controlled hydraulic fluid outlets.

21. The work vehicle of claim 18, wherein the control unit communicates the same control signal to the first hydraulic control valve and to the second hydraulic control valve.

22. The work vehicle of claim 18, wherein the control unit is configured to generate control signals to provide selective control between the first, the second, and the third actuator systems based on at least one of a fixed program sequence and a learned program sequence.

* * * * *